US007818221B2

(12) United States Patent
Fichtinger et al.

(10) Patent No.: US 7,818,221 B2
(45) Date of Patent: Oct. 19, 2010

(54) METHOD AND APPARATUS FOR VARIABLE REGULATORY OR CONDITIONAL USE COMPLIANCE MAXIMIZING USE OF AVAILABLE INVENTORY

(75) Inventors: David John Fichtinger, Rochester, MN (US); Ivory Wellman Knipfer, Rochester, MN (US); Jason Scott Lee, Oronoco, MN (US); Fraser Allan Syme, Rochester, MN (US); Matthew H. Zemke, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1015 days.

(21) Appl. No.: 11/557,736

(22) Filed: Nov. 8, 2006

(65) Prior Publication Data

US 2008/0109329 A1    May 8, 2008

(51) Int. Cl.
*A01K 5/02* (2006.01)
*G06F 17/50* (2006.01)
*G06Q 10/00* (2006.01)
(52) U.S. Cl. .......................................... 705/29; 705/28
(58) Field of Classification Search .................. 705/28, 705/29
See application file for complete search history.

(56) References Cited

U.S. PATENT DOCUMENTS

| 5,831,859 | A | 11/1998 | Medeiros et al. |
| 7,054,704 | B2 | 5/2006 | Bickley et al. |
| 7,054,706 | B2 | 5/2006 | Kempf et al. |
| 7,251,569 | B2 * | 7/2007 | Avila et al. .................... 702/23 |
| 2002/0177911 | A1 * | 11/2002 | Waugh et al. .................. 700/30 |
| 2002/0194014 | A1 * | 12/2002 | Starnes et al. .................. 705/1 |
| 2003/0018490 | A1 | 1/2003 | Magers et al. |
| 2003/0101179 | A1 * | 5/2003 | Lee et al. ........................ 707/7 |
| 2003/0187534 | A1 * | 10/2003 | Suzuki et al. ............... 700/107 |
| 2005/0197786 | A1 | 9/2005 | Kataria et al. |
| 2006/0220660 | A1 * | 10/2006 | Ninagawa et al. ........... 324/663 |
| 2006/0235561 | A1 * | 10/2006 | Lopez ........................ 700/117 |
| 2006/0253336 | A1 * | 11/2006 | Lin et al. ...................... 705/26 |

(Continued)

OTHER PUBLICATIONS

Panichkun, Piangjai, Optimizing Tolerance Allocation for Normally Distributed Dimensions Including Process Capability Constraints, Graduate School of Clemson University, Dec. 2001.*

(Continued)

*Primary Examiner*—Matthew S Gart
*Assistant Examiner*—Scott A Zare
(74) *Attorney, Agent, or Firm*—Yee & Associates, P.C.; Steven L. Bennett

(57) ABSTRACT

A computer implemented method, apparatus, and computer program product for managing variable regulatory compliance in a supply chain. The process identifies a variable regulatory compliance for a production order. Variable regulatory compliance is a percentage of a given attribute of the production order in compliance with order compliance rules. The process selects a set of compliant parts based on a compliant supply-to-demand ratio. The set of compliant parts is a minimum number of compliant parts required to satisfy variable regulatory compliance. The process selects a set of non-compliant parts based on a non-compliant supply-to-demand ratio. The process generates a list of recommended parts for use in manufacturing a product specified by the production order. The list of recommended parts comprises the set of compliant parts and the set of non-compliant parts.

20 Claims, 6 Drawing Sheets

U.S. PATENT DOCUMENTS

2007/0043635 A1* 2/2007 Hotta et al. ............... 705/28
2007/0061310 A1* 3/2007 Ninagawa et al. ............ 707/3
2007/0160721 A1* 7/2007 Lee et al. .................. 426/250
2008/0154749 A1* 6/2008 D'hooghe et al. ........... 705/28

OTHER PUBLICATIONS

Avila, German. Product development for RoHS and WEE compliance: environmental compliance regs are here to stay. May 2006. Printed Circuit Design & Manufacture. v 23, n 5, p. 28 (4).*

* cited by examiner

FIG. 4

| PART | RoHS PART COMPLIANCE | COMPLIANT DEMAND | NON-COMPLIANT DEMAND | SUPPLY QUANTITY | COMPLIANT SUPPLY: DEMAND | NON-COMPLIANT SUPPLY: DEMAND |
|---|---|---|---|---|---|---|
| PART A | C | 4 | 2 | 2 | 0.50 | 1.00 |
| PART A' | C | 6 | 2 | 8 | 1.33 | 4.00 |
| PART A" | NC | 0 | 16 | 10 | 100 | 0.63 |
| PART B | C | 5 | 0 | 4 | 1.25 | 100 |

400 MAXIMUM PNs DEMAND/ STOCKING MATRIX

1. COMPLIANCE REQUIRED, B HAS HIGHEST COMPLIANCE SUPPLY/DEMAND RATIO, THEREFORE ALLOCATE B.
2. COMPLIANCE SATISFIED.
3. NOW THAT COMPLIANCE IS SATISFIED, BIAS IS SWITCHED; NOW, WE FAVOR THE USE OF NON-COMPLIANT STOCK TO PROTECT OUR COMPLIANT SUPPLY.
4. USE NON-COMPLIANT PART WITH LARGEST SUPPLY/LEAST DEMAND IF POSSIBLE. THEREFORE, ALLOCATE A".

| ORDER Y PARTS | GROUP COMPLIANCE SUPPLY/DEMAND RATIO |
|---|---|
| PART A, A', (A") | 1.00 |
| PART (B) | 1.25 |

OPTIMIZED NEW METHOD ALLOCATES A" AND B

METHOD AND APPARATUS FOR VARIABLE REGULATORY OR CONDITIONAL USE COMPLIANCE MAXIMIZING USE OF AVAILABLE INVENTORY

BACKGROUND OF THE INVENTION

1. Field of the Invention

The present invention is related generally to a data processing system and in particular to a method and apparatus for a supply chain. More particularly, the present invention is directed to a computer implemented method, apparatus, and computer usable program code for enabling variable regulatory or conditional part usage compliance maximizing use of available inventory.

2. Description of the Related Art

Government product and import/export regulations governing the manufacture of various products are becoming increasingly complex every year. In addition, the regulations imposed upon product manufacture can vary depending on the nation, state, and/or region where a particular product will be manufactured, sold, delivered, or utilized. For example, the Restriction of Hazardous Substances Directive (RoHS), adopted in 2003 by the European Union (EU), restricts the use of certain hazardous materials, such as lead and mercury, in the manufacture of electronic and electrical equipment. Each EU member state can adopt its own unique policies and regulations using the RoHS directive as a guide. Thus, there could be as many different versions of RoHS as there are states in the EU.

The requirements for an entity to be in compliance with regulations can vary by ship-to country (product destination), plant of manufacture, machine type, variable compliance rules, or any other factors. A supply chain could also establish its own conditional usage rules, which for the purpose of this discussion look very much like the aforementioned compliance rules and need to be controlled in the same fashion. Under these conditions, managing production of ordered product having unique structure on a country by country and product by product basis to ensure compliance with each country's unique regulations and each unique conditional usage statement is extremely expensive.

Variable compliance regulates the manufacture of a product on percentage basis or percentage compliance for a given product. In other words, if a country regulates the use of lead, the regulations may only require a percentage of the final product be in compliance rather than requiring every part in the product be in complete compliance. Relative compliance can be applied to the part number (PN) count, part number value, product weight, product cost, or any other product feature or variable.

For example, if variable compliance is fifty percent (50%) of part number count then half of the parts in the final product must be in compliance with relevant regulations. If percentage compliance is seventy-five percent (75%) by weight, then the parts making up three-fourths (¾) of the weight of the final product must be in compliance. Likewise, if the percentage compliance is twenty-five percent (25%) of the product cost, then parts attributable to one-fourth (¼) of the cost of the product must be in compliance.

Compliant parts can be substituted for non-compliant parts. As used herein, a compliant part is a part that is in compliance with all applicable laws, rules, and/or regulations, or that meets a supply chain's own conditional usage rules, when applied to a certain product in a defined context. A non-compliant part is a part that is not in compliance with the applicable laws, rules, and/or regulations, or that does not meet a supply chain's own conditional usage rules, when applied to a certain product in a defined context. However, a non-compliant part cannot be substituted for a compliant part. If a non-compliant part is unavailable, a compliant part can be used in its place. However, if a compliant part is unavailable, a non-compliant part cannot be used. In other words, the substitution is one-way. Thus, compliant parts can become a bottle-neck hindering completion of a product if a required compliant part is unavailable. The fact that the compliant parts can be used in situations where compliance is not required increases flexibility, and is necessary in a transition from non-compliant to compliant parts; unfortunately this greatly increases the chance that compliant parts will be used to fulfill demand for which they are not needed, and thus be unavailable for demand for which they are indeed required.

Current manufacturing processes do not support percentage compliance. Compliance is controlled on an all-or-nothing basis. In other words, a product is manufactured using all compliant parts or all non-compliant parts. In particular, current regulatory compliance and usage of inventory is controlled by the release of specific new compliant part numbers and new Bills of Material to cover each variation and control compliance. A Bill of Material is a document describing materials, components, and subassemblies required to produce a given product.

Current methods also apply manual work direction on the shop floor to control compliance, with the use of part substitution tables and ad-hoc manual controls for inventory. In other words, a user manually checks part numbers for substitution parts in compliance with applicable regulations or conditional usage rules. These methods result in excessive complexity in the entire supply chain or uncontrollable, non-repeatable manual processes. Moreover, current methods do not permit the best use of available inventory to take advantage of percentage compliance and other conditional use situations.

BRIEF SUMMARY OF THE INVENTION

Exemplary embodiments describe a computer implemented method, apparatus, and computer program product for managing variable regulatory compliance or conditional use in a supply chain. The process identifies a variable regulatory compliance for a production order. Variable regulatory compliance is a percentage of a given attribute of the production order in compliance with order compliance rules. The process selects a set of compliant parts based on a compliant supply-to-demand ratio. The set of compliant parts is a minimum number of compliant parts required to satisfy variable regulatory compliance. The process selects a set of non-compliant parts based on a non-compliant supply-to-demand ratio. The process generates a list of recommended parts for use in manufacturing a product specified by the production order. The list of recommended parts comprises the set of compliant parts and the set of non-compliant parts.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is a block diagram of a demand and stocking matrix for controlling variable regulatory compliance in accordance with an exemplary embodiment;

DETAILED DESCRIPTION OF THE INVENTION

Figure 1:
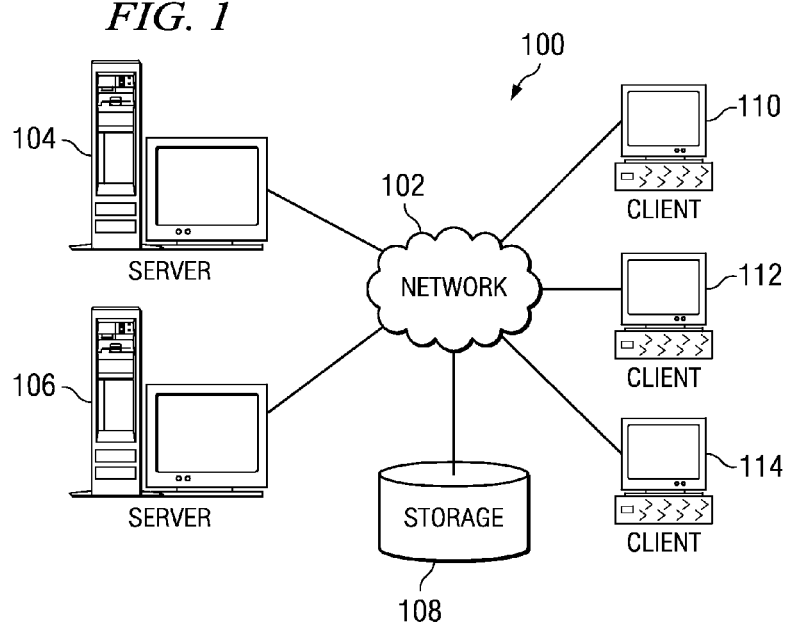
FIG. 1 is a pictorial representation of a network of data processing systems in which exemplary aspects may be implemented.
Figure 2:
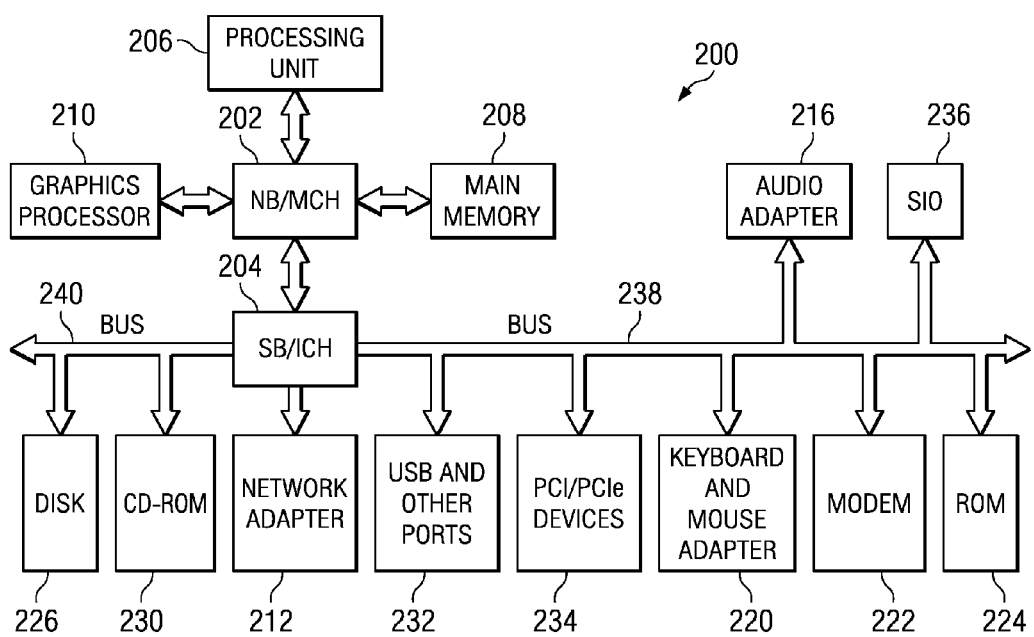
FIG. 2 is a block diagram of a data processing system in which exemplary aspects may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

Referring now to FIG. 1, a pictorial representation of a network of data processing systems is depicted in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. In this example, server 104 and 106, and clients 110, 112, and 114 are computing devices. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, a telephone device, or a personal media player, such as an iPod®, in addition to taking the form of a PDA.

Variable compliance is a percentage compliance required for a given attribute of a product that is required to be in compliance with order compliance rules. Variable compliance regulates the manufacture of a product on percentage basis or percentage compliance for a given product. Relative variable compliance can be applied to production order variables such as the part number (PN) count, part number value, product weight, product cost, or any other product feature or variable. Thus, in a variable compliance situation, a final product containing both compliant parts and non-compliant parts can be in complete compliance with applicable regulations. As used herein, a compliant part is a part that is in compliance with applicable regulations, such as order compliance rules. A non-compliant part is a part that is not in compliance with order compliance rules.

Compliant parts can be substituted for non-compliant parts. However, this substitution is one-way. A non-compliant part cannot be substituted for a compliant part. In other words, if a non-compliant part is unavailable, a compliant part can be used in its place. However, if a compliant part is unavailable, a non-compliant part cannot be used. Thus, compliant parts can become a bottle-neck hindering completion of a product if the required compliant part is unavailable.

However, current manufacturing processes support only an all-or-nothing (on/off) compliance condition. In other words, all the parts used to manufacture a given product are in compliance or all the parts in the given product are not in compliance. If compliance is required, then only compliant parts are used. In the alternative, part substitutions are made manually during production. In this case, a user must manually check part numbers and determine compliant part number substitutions to ensure compliance with regulations. Current methods do not support conditions in which certain percentages of compliant parts and non-compliant parts are allowed for manufacturing a product. Thus, current methods do not permit the best use of available inventory.

However, the illustrative embodiments recognize that best use of inventory is achieved by managing variable item control or compliance to optimize available compliant inventory. Variable item control enables a process to utilize a minimum number of compliant parts rather than all compliant parts. Once variable compliance is satisfied by the minimum number of compliant parts, non-compliant parts are selected preferentially over compliant parts to complete the production order. This preferential use of non-compliant parts preserves the currently available stock of compliant parts for use in other orders.

Thus, the illustrative embodiments provide a computer implemented method, apparatus, and computer program product for enabling variable regulatory compliance in a supply chain optimizing use of current inventory. More particularly, the illustrative embodiment is directed to a computer implemented method, apparatus, and computer usable program code for enabling variable regulatory compliance, or any other conditional part usage restrictions devised internally by the Supply Chain, or externally by bodies affecting the supply chain, maximizing use of available inventory.

As used herein, the term "regulatory compliance" includes governmental or legal rules and regulations, as well as non-governmental conditional use restrictions devised internally by the Supply Chain, externally by bodies affecting the supply chain, or by any other governmental or non-governmental entity imposing laws, rules, regulations, standards, requirements, or any other compliance on a part or product.

The process retrieves order compliance rules and a set of identified parts for a given production order. Order compliance rules define the level of compliance with laws regulating the manufacture of products required by a particular country. Order compliance rules can be based on a number of different factors, such as the machine type of the product, the type of order, country of manufacture, the ship-to country (product delivery or destination), and variable compliance.

The process determines a variable regulatory compliance for a production order. Variable regulatory compliance is a percentage of a given attribute of the production order in compliance with order compliance rules. The process selects a set of compliant parts based on a compliant supply-to-demand ratio, continuing until the Variable regulatory or conditional use compliance target for the production order is met. The supply-to-demand ratio is used such that the process selects the parts with the most available supply/least encumbered demand, to make the best use of the available compliant inventory across the entire set of production orders, minimizing the possibility that the availability of a compliant part will become a bottleneck. The set of compliant parts is a minimum number of compliant parts required to satisfy variable regulatory compliance for that production order. Upon satisfaction of the Variable Compliance rules, bias is inverted to the selection of non-compliant parts to complete the production order, and the process selects a set of non-compliant parts based on a non-compliant supply-to-demand ratio. The process generates a list of recommended parts for use in manufacturing a product specified by the production order, in the exemplary method by updating the production order itself to reflect this recommended parts list. The list of recommended parts comprises the set of compliant parts and the set of non-compliant parts.

Figure 3:
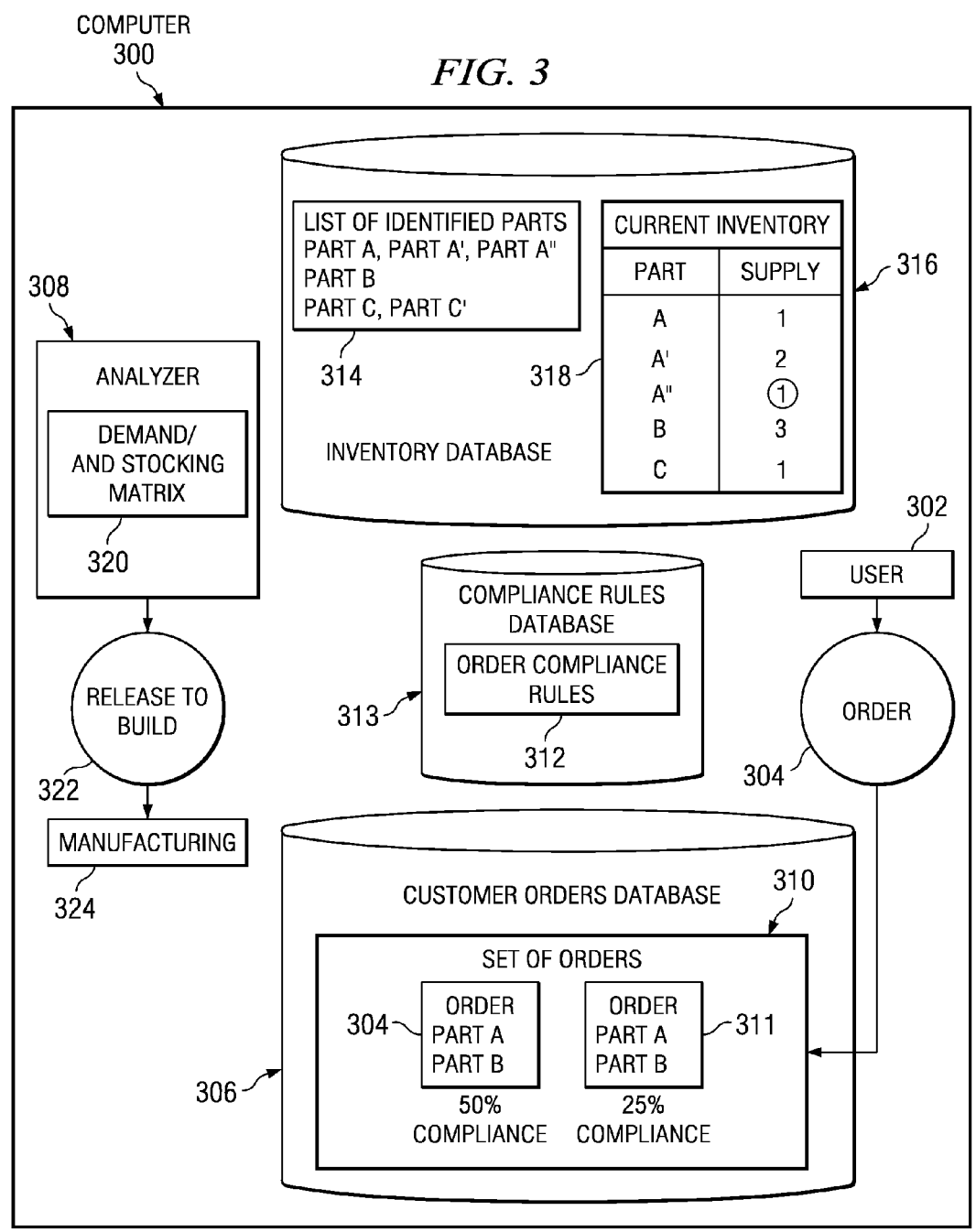
FIG. 3 is a block diagram illustrating a dataflow when a variable compliance is used to control regulatory compliance in accordance with an exemplary embodiment.

Turning now to FIG. 3, a block diagram illustrating a dataflow when a variable compliance is used to control regulatory compliance is shown in accordance with an exemplary embodiment. Computer 300 is any type of computing device, such as a personal computer, laptop, personal digital assistant, or any other computing device depicted in FIGS. 1 and 2. User 302 enters a production order, such as order 304, into computer 300 for analysis. Order 300 is a production order calling out or specifying one or more part numbers required to complete manufacture of a given product.

Computer 300 stores order 304 in a data storage device, such as storage 108 in FIG. 1. In this example, order 304 is stored in a database, such as customer order database 306.

Customer order database 306 is a database for storing information, such as production orders.

Analyzer 308 is a software controller for managing variable regulatory compliance in a supply chain. Analyzer 308 retrieves a set of orders 310 from customer order database 306. Set of orders 310 includes one or more production orders. In this example, set of orders 310 includes order 304 and order 311.

Analyzer 308 retrieves order compliance rules 312 from compliance rules database 313. Compliance rules database 313 is any type of known or available data storage device for storing data, such as storage 108 in FIG. 1. Compliance rules database 313 stores order compliance rules 312.

Order compliance rules 312 is a set of all laws, rules, regulations, conditional use, and/or controls applicable to a given production order or set of production orders. Order compliance rules 312 includes regulatory or governmental/legal compliance rules, as well as any other non-governmental conditional part usage restrictions devised internally by the Supply Chain, or externally by bodies affecting the supply chain. In this case, order compliance rules 312 contain the set of regulations and compliance rules applicable to set of orders 304 and 311. Order compliance rules 312 include one or more regulations applicable to order 304 and/or order 311.

Analyzer 308 also retrieves list of identified parts 314 from inventory database 316. Inventory database 316 is any type of known or available data storage device for storing data, such as storage 108 in FIG. 1. In this example, inventory database 316 is a database for storing information, such as listings of part numbers and quantities available thereof.

List of identified parts 314 includes a listing of all specified parts and alternative parts for each order in set of orders 310. A specified part is a called out part specified by a given production order. An alternative part is a part that can be substituted for a specified part. In this example, list of identified parts 314 includes part A, part B, and part C. List of identified parts 314 also includes alternative part A', alternative part A", and alternative part C'. A specified part and the alternative parts for that specified part forms a part group. A part group is a specified part and all alternative parts that can be substituted for the specified part. For example, part group A includes part A, part A', and part A". Part A' and part A are not identical, however, Part A' can be substituted for part A. Likewise, part A" can be substituted for part A or part A'.

Analyzer 308 retrieves current inventory 318 for each part in list of identified parts 314. Current inventory indicates a number or quantity of each part in list of identified parts 314 that is currently available in on-hand or current inventory.

Analyzer 308 identifies a current demand for each part in list of identified parts 314. A current demand for a part is a count of a quantity of a given part number specified by each production order in set of orders 310. In this example, a current demand for part A is one (1), a current demand for part B is two (2), and a current demand for part C is one (1).

Analyzer 308 determines a part number compliance for each part in list of identified parts. A part number compliance indicates whether a given part number is in compliance with order compliance rules 312. In this example, analyzer 308 determines that part A is compliant (C) but substitute parts A' and A" are non-compliant (NC). Analyzer 308 stores part number compliance 319 in inventory database 316.

Analyzer 308 determines a variable compliance for each production order in set of orders 311. Variable compliance is a percentage compliance required for a given attribute of the production order. In this example, order 304 requires fifty percent (50%) compliance. Order 311 requires twenty-five percent (25%) compliance. Therefore, both order 304 and order 311 are regulated orders requiring some level of compliance with order compliance rules. However, orders 304 and 311 are not required to be in complete or one-hundred percent (100%) compliance.

The given attribute of the production order that is required to be in partial compliance with order compliance rules 312 is any variable relating to a product. For example, a variable can include a total number of parts used in a product, a value of all parts used in a product, a weight of a product derived from all parts used in the product, and a cost of a finished product.

For example, if a production order requires fifty percent (50%) compliance by a part number count attribute for the finished product, then half of the parts in the finished product should be compliant parts for the finished product to be compliant. In other words, if a product has four (4) parts, at least two (2) of the four parts must be compliant. If two or more parts are compliant then the product is compliant. However, if only one part is compliant then the finished product will not meet order level compliance.

Analyzer 308 determines a supply-to-demand ratio for each part in list of identified parts 316. A supply-to-demand ratio is a ratio of a supply of a given part in current inventory to a demand for the given part. In this example, analyzer 308 calculates a compliant supply-to-demand ratio and a non-compliant supply-to-demand ratio for each part. A compliant supply-to-demand ratio is a ratio of current demand for a part number by compliant production orders requiring some compliance with order compliance rules 312 to the total supply of the given part number in current inventory 318.

For example, both orders 303 and 311 require some compliance with order compliance rules 312. Both order 304 and order 311 specify part B. The current compliant demand or demand for part B by orders requiring some percentage of compliance with order compliance rules 312 is two (2) because a part number for part B is specified by order 304 and 311. The available quantity of part B in current inventory 318 is three (3). Therefore, a compliant supply-to-demand ratio for part B is 1.5.

A non-compliant supply-to-demand ratio is a current demand for a given part number by non-compliant production orders. In this case, set of orders 310 does not include any non-compliant production orders. A non-compliant supply-to-demand ratio can be calculated by dividing a current demand for a given part number by non-compliant production orders by the quantity of the part number available in on-hand or current inventory.

Analyzer 308 generates a demand and stocking matrix 320 based on set of orders 310. Demand and stocking matrix 320 provides information regarding possible parts available for use in completing production orders and variable compliance. For example, demand and stocking matrix includes, but is not limited to, a set of part numbers for specified parts and alternative parts; a quantity of each part number available in current inventory; a demand for each part number; part number compliance identifying whether a given part number is a compliant part or a non-compliant part; compliant supply-to-demand ratio for each part number; and non-compliant supply-to-demand ratio for each part number.

Analyzer 308 selects a compliant part with the highest supply-to-demand ratio to form the set of compliant parts. In other words, production order 304 requires part A and part B. Analyzer 308 will choose a specified part or alternative part that is compliant and has the highest compliant supply-to-demand ratio. The part number with the highest supply-to-demand ratio is the part number that is most available in current inventory. In this example, analyzer 308 determines that part B is the part number with the highest compliant supply-to-demand ratio. Analyzer 308 generates a set of compliant parts that includes part B.

Analyzer 308 makes a determination as to whether the set of compliant parts satisfies the variable compliance. In this case, part B is a compliant part and only one compliant part is required to satisfy the variable compliance of fifty percent (50%) by part number count. The set of compliant parts is a minimum number of compliant parts required to satisfy the variable compliance. Part B satisfies the variable compliance for part number count. Therefore, no additional compliant parts are required for a final product for order 304 to be compliant.

However, if analyzer 308 determined that the set of complaint parts including only part B did not satisfy variable compliance, analyzer 308 iteratively continues to select and add a next compliant part having a next highest supply-to-demand ratio to the set of compliant parts until the compliant parts in the set of compliant parts satisfies the variable compliance.

Analyzer 308 makes a determination as to whether the parts in the set of compliant parts include all parts required to complete the production order. In this example, the set of compliant parts does not include a part from part group A. Therefore, the set of compliant parts does not include all parts required to complete order 304.

Analyzer selects the remaining parts using the non-compliant supply-to-demand ratio. The non-compliant supply-to-demand ratio favors selection of non-compliant parts over compliant parts. Analyzer 308 selects a non-compliant part with the highest supply-to-demand ratio for each remaining part group to form the set of non-compliant parts. In this manner, analyzer 308 selects a set of non-compliant parts to complete the production order.

Analyzer 308 iteratively continues selecting a next part with a next highest non-compliant supply-to-demand ratio until the set of compliant parts and non-compliant parts includes a representative from each part group specified in order 304.

Thus, analyzer 308 preferentially selects non-compliant parts over a compliant part after analyzer 308 determines that variable compliance has already been satisfied by previously selected compliant parts. However, if a non-compliant part is not available, analyzer 308 will select a compliant part to complete the production order.

Analyzer 308 generates a set of recommended parts for use in manufacturing a product specified by order 304. The set of recommended parts includes the selected set of compliant parts and the selected set of non-compliant parts. Analyzer 308 determines that the set of recommended parts satisfies compliance requirements and includes all parts required to complete the production order. Analyzer 308 releases the production order to manufacturing to build 322 the product specified by order 304. Manufacturing 324 utilizes the set of recommended parts to manufacture the product. Thus, the product is manufactured in compliance with order compliance rules 312 using a minimum number of compliant parts most available in a current inventory 318.

In this illustrative example, customer order database 306, compliance rules database 312, and inventory database 316 are local databases located on or locally to computer 300. However, database 306, 313, and 316 can also be located remotely to computer 300. A remote database can be located on a server, such as server 104 in FIG. 1. The server can be a server on a network, such as network 102 described in FIG. 1.

Computer 300 can access a remote database on a server through a network connection via a network device (not shown). A network device can be any type of known or available network access software to access a network. The network connection permits access to any type of network, such as a local area network (LAN), a wide area network (WAN), or the Internet.

FIG. 4 is a block diagram of a demand and stocking matrix for controlling variable regulatory compliance in accordance with an exemplary embodiment. Demand and stocking matrix 400 is a matrix containing information regarding parts in current inventory and parts required by one or more production orders, such as demand and stocking matrix 320 in FIG. 3.

Demand and stocking matrix 400 includes a list of identified parts 402 for one or more production orders, such as list of identified parts 314 in FIG. 3. List of identified parts 402 includes specified parts and alternative parts for the specified parts. Demand and stocking matrix 400 also includes part number compliance 404 indicating whether each part in list of identified parts 402 is in compliance with applicable regulations, such as RoHS regulations, or other conditional use factors.

Demand and stocking matrix 400 includes compliant demand 406 and non-compliant demand 408. Compliant demand 406 is a quantity of a given part number specified by production orders requiring complete or partial compliance with applicable regulations. Non-compliant demand is a quantity of a given part number specified by production orders that do not require compliance to any regulations.

Supply quantity 412 indicates a number of each part available in on-hand inventory. Demand and stocking matrix 400 also provides compliant supply-to-demand ratio 412 and non-compliant supply-to-demand ratio. The higher the supply-to-demand ratio, the more available a given part is in current inventory relative to the demand for that part. In other words, a part with the highest supply-to-demand ratio is the most available part in inventory.

In this example, a production order Y 416 specifies two parts, part A and part B. The production order requires fifty percent (50%) compliance by part number count. The analyzer favors selection of compliant parts until variable compliance is satisfied. The analyzer determines that part group B compliance supply-to-demand ratio 418 (1.5) is greater than for group part A (1.0). Therefore, compliant group part B is selected. Group part B includes no alternative parts for specified part B. Therefore, part B is selected for the set of compliant parts. Part B satisfies variable regulatory compliance for order Y. Therefore, the analyzer now switches the bias to favor non-compliant parts rather than compliant parts.

The analyzer now applies non-compliant supply-to-demand ratio to select the remaining parts for order Y. The analyzer selects the non-compliant part with the largest supply and least demand, if a non-compliant part is available. In this illustrative example, the analyzer selects part A" because part A" is the only non-compliant part available. The analyzer selects part B and part A" and updates the called out parts in order Y 416. Order Y 416 is in compliance and can be released to build.

Figure 5:
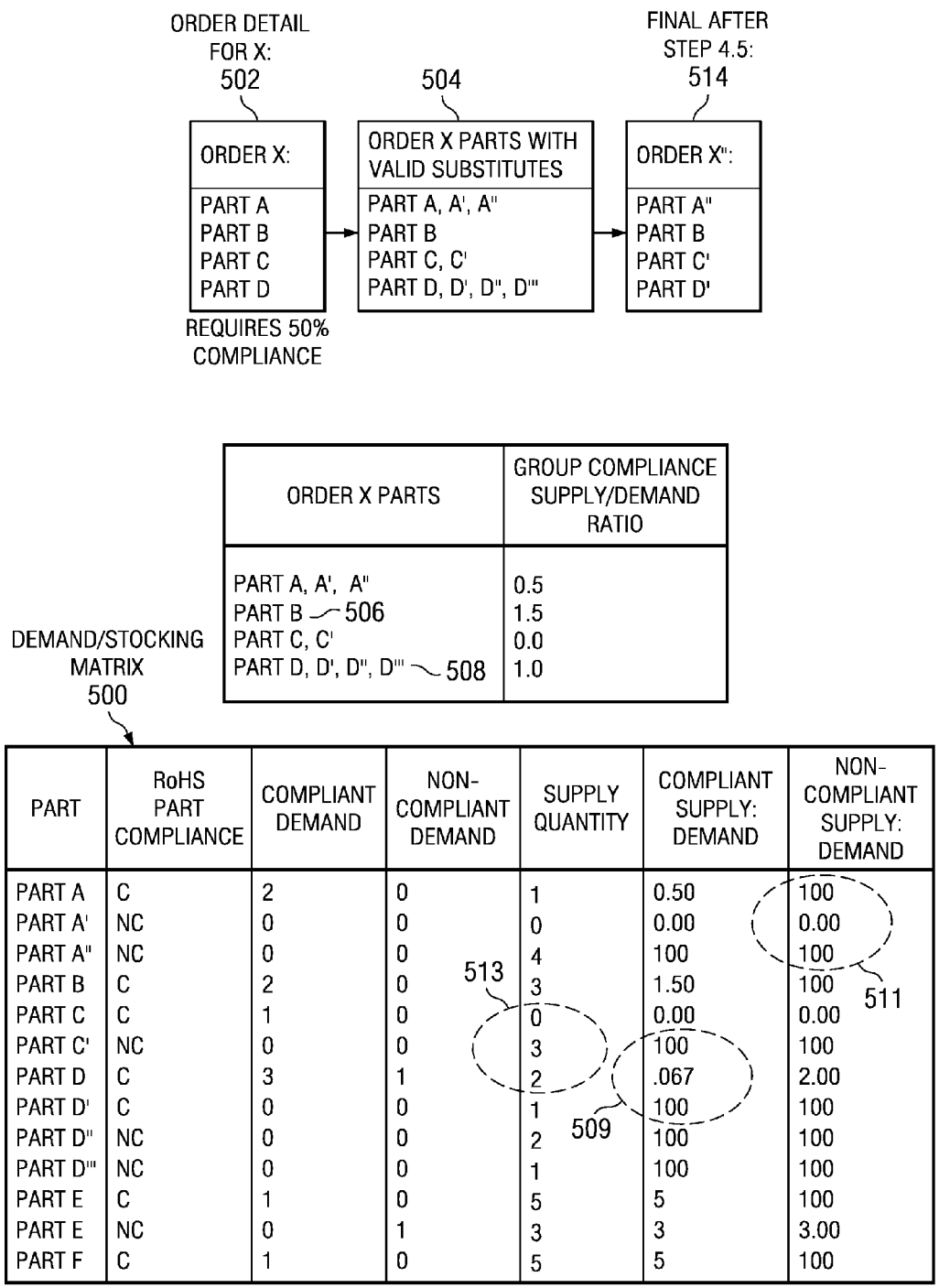
FIG. 5 is a block diagram illustrating a production order and stocking matrix for selecting compliant and non-compliant parts in accordance with an illustrative embodiment.

FIG. 5 is a block diagram illustrating a production order and stocking matrix for selecting compliant and non-compliant parts in accordance with an illustrative embodiment. Demand and stocking matrix 500 is a matrix containing information regarding parts in current inventory and parts required by one or more production orders, such as demand and stocking matrix 420 in FIG. 4.

Order X 502 requires fifty percent (50%) variable compliance by part number count. List of identified parts 504 includes specified parts and alternative parts for each part group. The analyzer sorts the identified parts by supply-todemand ratio. The analyzer allocates or selects a first compliant part with a highest group compliant supply-to-demand ratio. In this example, part B 506 has the highest ratio of 1.5 and there are no substitute parts available for part B.

The analyzer checks the current compliance based on the selected set of compliant parts. The current compliance is at twenty-five percent (25%). Therefore, compliance is not satisfied. The analyzer determines that an additional compliant part is needed to meet the production order level compliance.

The analyzer selects a compliant part with the next highest group compliance supply-to-demand ratio. A group compliance supply-to-demand ratio is a ratio of an available supply of compliant parts in current inventory to a current demand for that part. In this example, part D group 508 has the next highest group ratio of 1.0. The analyzer refers to demand and stocking matrix 500 to determine which part in the group part D group 508 has the highest compliant supply-to-demand ratio. In this case, alternative part D' has a compliant supply-to-demand ratio of 100 and specified part D has a compliant supply-to-demand ratio of only 0.67 as shown in compliant supply-to-demand ratio column 509. The analyzer selects part D' with the highest ratio and greatest availability in current inventory.

The analyzer determines that the 50% variable compliance is now satisfied by part B and part D'. The analyzer applies a non-compliant supply-to-demand ratio to the remaining parts. In this manner, the analyzer switches a bias to favor selection of non-compliant parts. Thus, the analyzer will allocate non-compliant parts where possible after an order level compliance is met.

In this example, the analyzer determines that part A" has the highest non-compliant supply-to-demand ratio 511. The analyzer allocates A". The analyzer continues allocating non-compliant parts where possible until all remaining parts required by production order X 502 has been allocated. The analyzer allocates part C' because it is the only part available in current inventory as indicated by supply quantity 513 in demand and stocking matrix 500. Thus, the analyzer generates a list or recommended parts 514 that includes parts A", part B, part C', and part D'. The list of recommended parts 514 is the minimum number of compliant parts and the most available compliant and non-compliant parts in current inventory to satisfy order level compliance.

Figure 6:
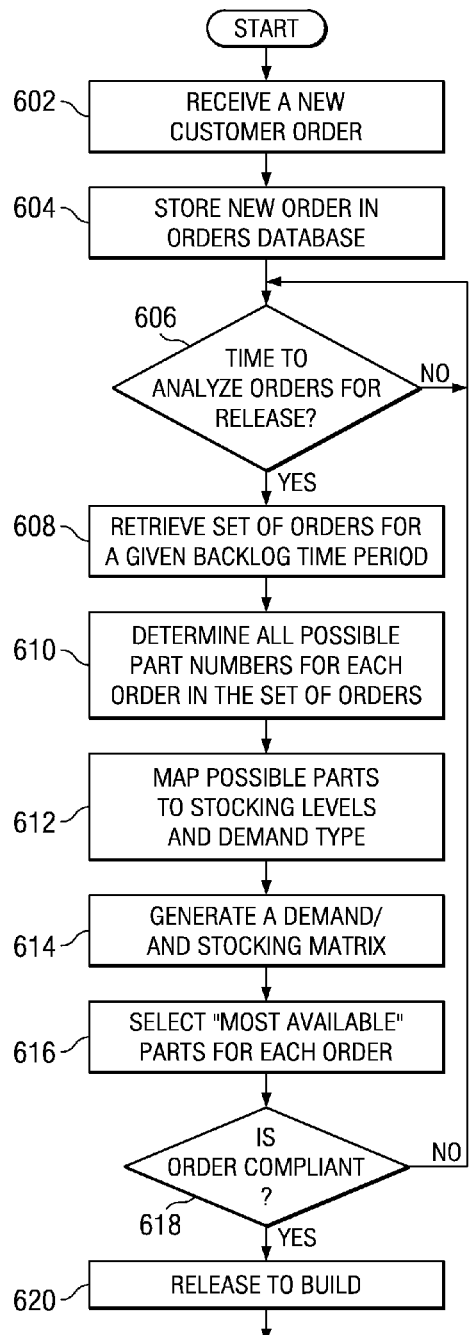
FIG. 6 is a flowchart illustrating a process for using variable compliance to process a new customer order in accordance with an illustrative embodiment.

Referring now to FIG. 6, a flowchart illustrating a process for using variable compliance to process a new customer order is shown in accordance with an illustrative embodiment. In this illustrative example shown in FIG. 6, the process is performed by a software component for managing variable regulatory compliance, such as analyzer 308 in FIG. 3.

The process begins by receiving a new customer order (step 602). The new customer order is a production order specifying a product to be manufactured. Some of the orders require part level control, such as compliance with one or more regulations. Control and/or compliance requirements can be variable regulatory compliance as to an attribute of the order or product specified by the order, such as a percent content of the order, a percent of the weight of the product, a percent of the cost of the product, or a percent of the cost of the product. The process stores the new order in an order database, such as customer order database 306 in FIG. 3.

The process then makes a determination as to whether it is time to analyze order for release to manufacturing (step 606). At some point in time a set of orders are analyzed for release. The point in time can be a predetermined time, a frequency, such as every hour, or a predetermined event trigger to indicate manufacturing is available to handle additional orders. If the process determines that a time to analyze orders has occurred, the process retrieves a set of orders for a given backlog horizon (step 608). A backlog horizon is a given time interval, such as a single day or two weeks. The process determines all possible part numbers that can be used to manufacture a product specified by each order in the set of orders (step 610). The possible part numbers include all parts specified by an order, as well as all alternate parts that can be substituted for a specified part.

The process maps the possible parts to current stocking levels and demand type for each part (step 612). In other words, the process determines a quantity of each part available in on-hand delivery and a quantity of each part specified by the set of orders. The process generates a demand and stocking matrix (step 614) based on the set of orders, the possible part numbers, the current stocking levels, and the demand for each part.

The process selects the parts that are most available or in least demand for each order (step 616). The process determines if each order is in compliance with the applicable order compliance rules (step 618). If the process determines that an order is not in compliance, the process returns to step 606 until a time to analyze orders for release occurs again. If the process determines that an order is compliant, the process releases that order to build (step 620) with the process terminating thereafter. In other words, after selecting the most available parts for manufacturing a product specified by a given production order, the production order is released to manufacturing if the selected parts will result in a product in compliance with all applicable regulations or use conditions. Compliance is determined on an order by order basis.

Figure 7:
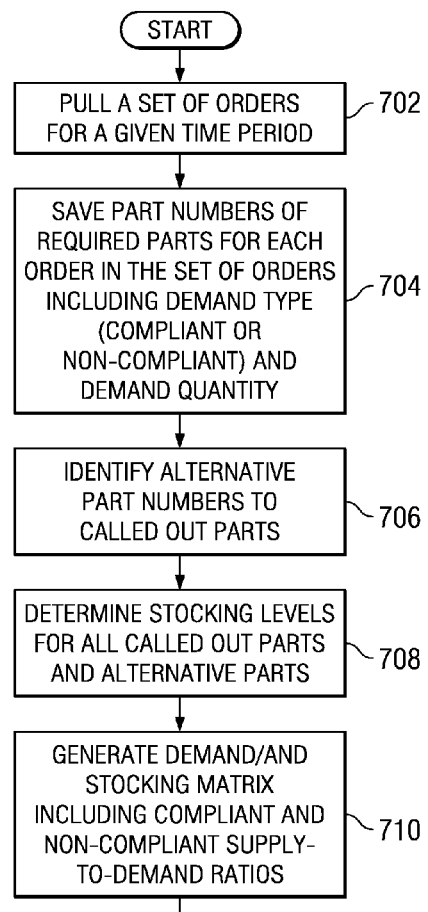
FIG. 7 is a flowchart illustrating a process for generating a demand and stocking matrix in accordance with an illustrative embodiment.

FIG. 7 is a flowchart illustrating a process for generating a demand and stocking matrix in accordance with an illustrative embodiment. In this illustrative example shown in FIG. 6, the process is performed by a software component for managing variable regulatory compliance, such as analyzer 308 in FIG. 3.

The process begins by pulling a set of backlog orders for a given time period (step 702). The set of backlog orders are orders waiting to be sent for manufacturing. The process saves or summarizes part numbers required by each order in the set of orders by demand type (step 704). In other words, the process determines if each order requires compliance to some regulations or use conditions. If any compliance is required, the order is a regulated order demanding some level of part compliance. As used herein, a regulated order refers to an order requiring compliance to any governmental or non-governmental regulations or use conditions. An order requiring compliance will require some compliant parts or all compliant parts.

If an order does not require compliance to any regulations or use conditions, the order is an unregulated order not limited or covered by regulations or use conditions in force. An unregulated order does not require any compliant parts. However, an unregulated order can utilize either compliant or non-compliant parts.

The process identifies alternative part numbers to called out parts (step 706). The process determines a current quantity or stocking level for all specified parts and alternative parts (step 708). The process generates a demand and stocking matrix including compliant supply-to-demand ratios and non-compliant supply-to-demand ratios (step 710) with the process terminating thereafter. The compliant and non-compliant supply-to-demand ratios for specified parts and alternative parts can be used to select parts that are most available in current inventory and in least demand. In this manner, the process can optimize utilization of current inventory and preserve the supply of compliant parts.

Figure 8:
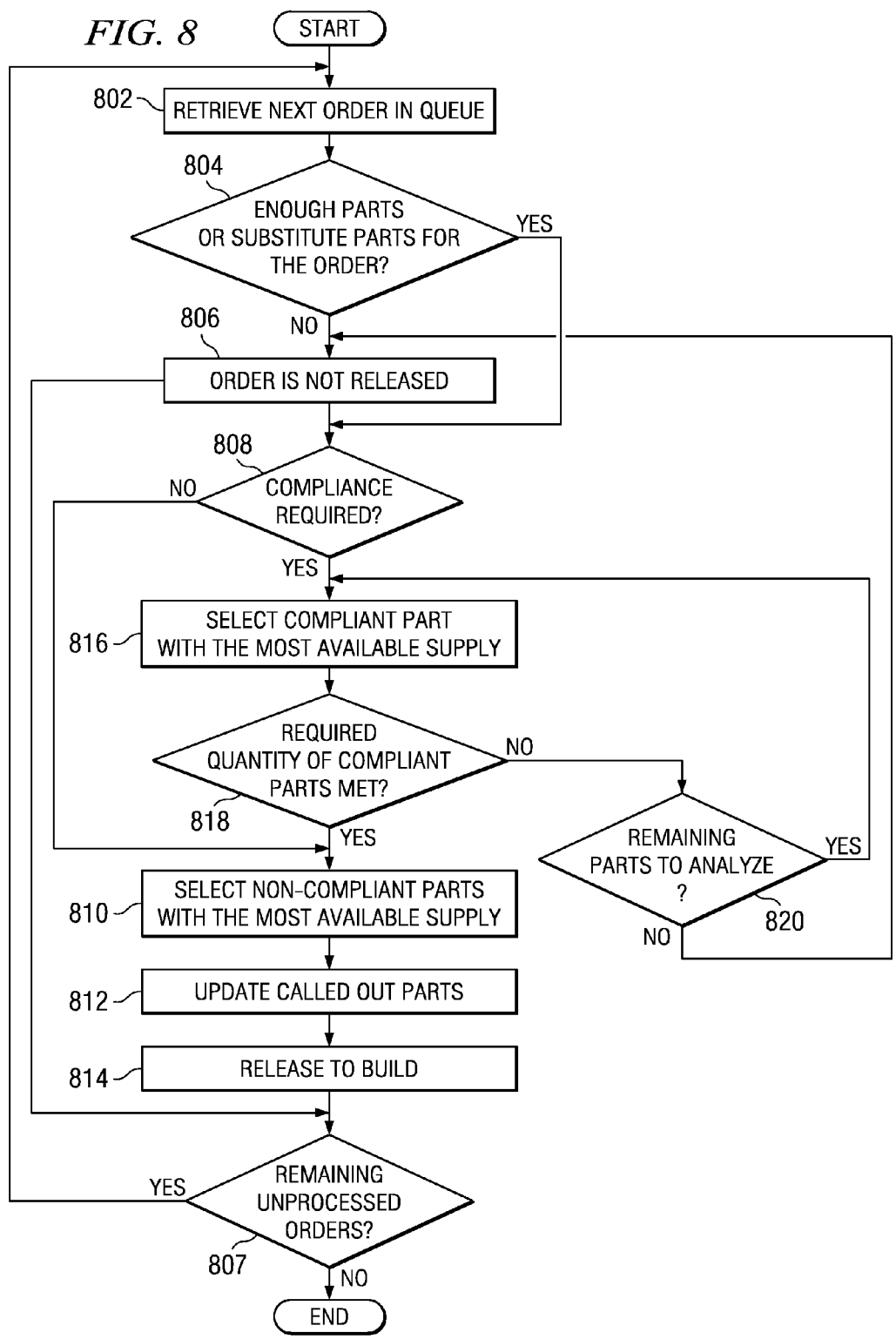
FIG. 8 is a flowchart illustrating a process for determining a number of compliant parts required by a given production order in accordance with an illustrative embodiment.

FIG. 8 is a flowchart illustrating a process for determining a number of compliant parts required by a given production order in accordance with an illustrative embodiment. In this illustrative example shown in FIG. 8, the process is performed by a software component for managing variable regulatory compliance, such as analyzer 308 in FIG. 3.

The process begins by retrieving a next order in a queue of orders waiting to be analyzed for release to build (step 802). The process makes a determination as to whether enough parts or substitute parts are available to complete the order (step 804). In other words, the process verifies that some level of stock exists for each part or alternative part. This is a traditional "clear-to-build inventory analysis" check. If the process makes a determination that enough parts are not available/the order is not clear to build, the process is not approved for release (step 806). This could occur if a group of parts has a quantity of zero in current inventory. A group of parts is a specified part and all alternative parts for the specified part. In such a case, the process makes a determination as to whether any unprocessed orders are remaining (step 807). If no unprocessed orders remain, the process terminates thereafter. If unprocessed orders are remaining in the queue, the process returns to step 802 and retrieves the next order in the queue.

Returning to step 804, if the process determines that sufficient parts exist, the process makes a determination as to whether any regulatory compliance is required (step 808). This determination is made based on control or compliance rules, such as order compliance rules 312 in FIG. 3. If the process determines that an order does not require any compliance with order compliance rules, the order is an unregulated order. The process selects non-compliant parts with the most available supply (step 810). If a non-compliant part is unavailable, a compliant part can be substituted for the non-compliant part. The process updates specified (called-out) parts on the order (step 812) and releases the order to manufacturing to build (step 814).

The process then makes a determination as to whether any unprocessed orders remain in the queue (step 807). If an order remains in the queue, the process returns to step 802 to retrieve a next order in the queue. If there are no remaining orders in the queue, the process terminates thereafter.

Returning now to step 808, if the process determines that some level of compliance is required by the order, the order is a regulated order. The process selects a compliant part with a most available supply in current inventory (step 816). In this example, the process determines which compliant part has the most available supply or least demand by selecting a compliant part with a highest compliant supply-to-demand ratio.

The process makes a determination as to whether required quantity of compliant parts are met (step 818). In other words, the process determines whether the selected compliant part satisfies the variable regulatory compliance for the give order. If the required quantity of compliant parts is not met, the process makes a determination as to whether any remaining parts still need to be analyzed (step 820). If the process determines that no additional parts are needed to complete the order and compliance has not been met by the selected parts, the order is not released to build (step 806). The process makes a determination as to whether any unprocessed orders remain in the queue (step 807). If any unprocessed orders remain, the process returns to step 802 to retrieve the next order. If no unprocessed orders remain, the process terminates thereafter.

Returning now to step 820, if the process determines that additional parts need to be allocated to complete the order, the process returns to step 816 and selects a next compliant part with the most available inventory or least demand at step 816. Steps 816-820 are repeated iteratively until compliance is met at step 818.

When the process determines that variable regulatory compliance has been met, the process selects non-compliant parts with the most available supply to complete the order (step 810). The process updates specified (called out) parts on the order (step 812) and releases the order to build (step 814). The order is then fulfilled or completed according to the updated list of called out parts.

The process makes a determination as to whether any unprocessed orders remain in the queue (step 807). If any unprocessed orders remain, the process returns to step 802 to retrieve the next order. If no unprocessed orders remain, the process terminates thereafter.

Thus, the illustrative embodiments provide a computer implemented method, apparatus, and computer program product for enabling variable regulatory or rules-based compliance in a supply chain optimizing use of current inventory. The process retrieves order compliance rules and a set of identified parts for a given production order. Order compliance rules define the level of compliance with laws regulating the manufacture of products required by a particular country, or conditional use requirements extant within the supply chain for said products. Order compliance rules can be based on a number of different factors, such as the machine type of the product, the type of order, country of manufacture, the ship-to country (product delivery or destination), and variable compliance.

The aspects of the illustrative embodiments recognize that in order to make best usage of available inventory, non-compliant parts should be used first or preferably in situations in which the non-compliant part can be used in place of a compliant part, such as in a variable compliance situation. The preference given to use of non-compliant parts preserves the supply of compliant parts for use in completing other orders.

The process enforces compliance with variable regulations or use conditions during production as work direction, rather than as a measurement after products are produced. The process ensures auditable and automatic regulatory compliance without human intervention. The process also ensures order kick-off or manufacturing of a product only when compliant build of the product is feasible with current on-hand inventory. The process also reduces costs associated with maintaining a Bill of Material structures and excess inventory to support on/off (all-or-nothing) compliance. Finally, the process eliminates manual processes for percentage compliance in which a user must manually check part numbers for alternative compliant parts during production.

The flowchart and block diagrams in the figures illustrate the architecture, functionality, and operation of some possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the illustrative embodiment has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing variable regulatory compliance in a supply chain, the computer implemented method comprising:
   identifying a variable regulatory compliance for a production order, wherein the variable regulatory compliance is a percentage of a given attribute of the production order in compliance with order compliance rules;
   selecting, by a processing unit, a set of compliant parts based on a compliant supply-to-demand ratio, wherein the set of compliant parts is a minimum number of compliant parts required to satisfy the variable regulatory compliance;
   selecting, by a processing unit, a set of non-compliant parts based on a non-compliant supply-to-demand ratio;
   generating a list of recommended parts for use in manufacturing a product specified by the production order, wherein the list of recommended parts comprises the set of compliant parts and the set of non-compliant parts; and
   calculating a ratio of a supply of a given part in current inventory to a demand for the given part by compliant production orders to form the compliant supply-to-demand ratio, wherein a compliant production order is a production order requiring compliance to the order compliance rules.

2. The computer implemented method of claim 1 wherein selecting the set of compliant parts further comprises:
   selecting a part group based on a group compliance supply-to-demand ratio, wherein a part group includes a part specified by the production order and all alternative parts that can be substituted for a specified part to form a selected part group.

3. The computer implemented method of claim 2 further comprising:
   selecting a compliant part with the highest compliant supply-to-demand ratio from the selected part group to form the set of compliant parts, wherein the compliant part with a highest supply-to-demand ratio is a most available compliant part in current inventory.

4. The computer implemented method of claim 1 wherein the non-compliant supply-to-demand ratio is a ratio of a supply of a given part in current inventory to a demand for the given part by non-compliant production orders, wherein a non-compliant production order is a production order that does not require compliance with order compliance rules.

5. The computer implemented method of claim 4 wherein selecting a set of non-compliant parts further comprises:
   responsive to a determination that the set of compliant parts does not include all parts required to manufacture the product specified by the production order, selecting a non-compliant part with the highest non-compliant supply-to-demand ratio to form the set of non-compliant parts.

6. The computer implemented method of claim 5 further comprising:
   iteratively adding a next non-compliant part with a next highest supply-to-demand ratio to the set of non-compliant parts until the set of compliant parts and non-compliant parts includes all parts required to manufacture the product specified by the production order.

7. The computer implemented method of claim 1 wherein the given attribute of the production order is at least one of a total number of parts used in a product, a value of all parts used in a product, a weight of a product derived from all parts used in the product, and a cost of a product.

8. The computer implemented method of claim 1 further comprising:
   generating a stocking matrix based on a set of production orders, wherein the stocking matrix comprises:
   a set of part numbers, wherein the set of part numbers includes parts specified by a production order and alternative parts that can be substituted for a specified part;
   a quantity of each part number available in current inventory;
   a demand for each part number;
   a part number compliance indicator identifying whether a given part number is a compliant part or a non-compliant part; and
   a supply-to-demand ratio for each part number.

9. The computer implemented method of claim 1 further comprising:

utilizing the list of recommended parts to manufacture a product specified by the production order, wherein the product is manufactured in compliance with the order compliance rules using a minimum number of compliant parts most available in a current inventory.

10. An apparatus comprising:
a storage device connected to a bus, wherein the storage device contains computer usable program code; and
a processor, wherein the processor unit is configured to execute the computer usable program code to identify a variable regulatory compliance for a production order, wherein the variable regulatory compliance is a percentage of a given attribute of the production order in compliance with order compliance rules; select a set of compliant parts based on a compliant supply-to-demand ratio, wherein the set of compliant parts is a minimum number of compliant parts required to satisfy variable regulatory compliance; select a set of non-compliant parts based on a non-compliant supply-to-demand ratio; generate a list of recommended parts for use in manufacturing a product specified by the production order, wherein the list of recommended parts comprises the set of compliant parts and the set of non-compliant parts; and calculate a ratio of a supply of a given part in current inventory to a demand for the given part by compliant production orders to form the compliant supply-to-demand ratio, wherein a compliant production order is a production order requiring compliance to the order compliance rules.

11. The apparatus of claim 10 wherein the processor unit is further configured to execute the computer usable program code to select a compliant part with the highest compliant supply-to-demand ratio from the selected part group to form the set of compliant parts.

12. The apparatus of claim 10 wherein the processor unit is further configured to execute the computer usable program code to select a non-compliant part with the highest non-compliant supply-to-demand ratio to form the set of non-compliant parts in response to a determination that the set of compliant parts does not include all parts required to manufacture the product specified by the production order.

13. A computer program product comprising:
a computer readable storage medium including computer usable program code for managing variable regulatory compliance in a supply chain, said computer program product comprising:
computer usable program code for identifying a variable regulatory compliance for a production order, wherein the variable regulatory compliance is a percentage of a given attribute of the production order in compliance with order compliance rules;
computer usable program code for selecting a set of compliant parts based on a compliant supply-to-demand ratio, wherein the set of compliant parts is a minimum number of compliant parts required to satisfy variable regulatory compliance;
computer usable program code for selecting a set of non-compliant parts based on a non-compliant supply-to-demand ratio;
computer usable program code for generating a list of recommended parts for use in manufacturing a product specified by the production order, wherein the list of recommended parts comprises the set of compliant parts and the set of non-compliant parts; and
computer usable program code for calculating a ratio of a supply of a given part in current inventory to a demand for the given part by compliant production orders to form the compliant supply-to-demand ratio, wherein a compliant production order is a production order requiring compliance to the order compliance rules.

14. The computer program product of claim 13 further comprising:
computer usable program code for selecting a part group based on a group compliance supply-to-demand ratio, wherein a part group includes a part specified by the production order and all alternative parts that can be substituted for a specified part to form a selected part group.

15. The computer program product of claim 14 further comprising:
computer usable program code for selecting a compliant part with a highest compliant supply-to-demand ratio from the selected part group to form the set of compliant parts.

16. The computer program product of claim 13 further comprising:
computer usable program code for selecting a non-compliant part with the highest non-compliant supply-to-demand ratio to form the set of non-compliant parts in response to a determination that the set of compliant parts does not include all parts required to manufacture the product specified by the production order.

17. The computer program product of claim 16 further comprising:
computer usable program code for iteratively adding a next non-compliant part with a next highest supply-to-demand ratio to the set of non-compliant parts until the set of compliant parts and non-compliant parts includes all parts required to manufacture the product specified by the production order.

18. The computer program product of claim 13 wherein the non-compliant supply-to-demand ratio is a ratio of a supply of a given part in current inventory to a demand for the given part by non-compliant production orders, wherein a non-compliant production order is a production order that does not require compliance with order compliance rules.

19. The computer program product of claim 13 wherein the given attribute of the production order is at least one of a total number of parts used in a product, a value of all parts used in a product, a weight of a product derived from all parts used in the product, and a cost of a product.

20. The computer program product of claim 13 further comprising:
computer usable program code for generating a stocking matrix based on a set of production orders, wherein the stocking matrix comprises:
a set of part numbers, wherein the set of part numbers includes parts specified by a production order and alternative parts that can be substituted for a specified part;
a quantity of each part number available in current inventory;
a demand for each part number;
a part number compliance indicator identifying whether a given part number is a compliant part or a non-compliant part; and
a supply-to-demand ratio for each part number.

* * * * *